(12) United States Patent
Hornick et al.

(10) Patent No.: US 11,511,705 B2
(45) Date of Patent: Nov. 29, 2022

(54) WINDSHIELD WIPER WITH ADAPTABLE ATTACK ANGLE

(71) Applicant: FlexSys, Inc., Ann Arbor, MI (US)

(72) Inventors: David C. Hornick, Ann Arbor, MI (US); Gregory F. Ervin, Ann Arbor, MI (US); Ruey-Khan K. Tsang, Ann Arbor, MI (US); Kerr-Jia Lu, Ann Arbor, MI (US); Mark R. Trost, Ann Arbor, MI (US); Paul W. Keberly, Ann Arbor, MI (US)

(73) Assignee: FlexSys, Inc., Ann Arbor, MI (US)

( * ) Notice: Subject to any disclaimer, the term of this patent is extended or adjusted under 35 U.S.C. 154(b) by 502 days.

(21) Appl. No.: 16/433,396

(22) Filed: Jun. 6, 2019

(65) Prior Publication Data
US 2020/0130650 A1  Apr. 30, 2020

Related U.S. Application Data

(60) Provisional application No. 62/753,239, filed on Oct. 31, 2018.

(51) Int. Cl.
*B60S 1/34* (2006.01)
*B60S 1/44* (2006.01)

(52) U.S. Cl.
CPC .......... *B60S 1/3406* (2013.01); *B60S 1/3409* (2013.01); *B60S 1/44* (2013.01)

(58) Field of Classification Search
CPC .... B60S 1/3486; B60S 1/0438; B60S 1/3495; B60S 1/3411; B60S 1/3801; B60S 1/3406; B60S 1/3497; B60S 2001/3812; B60S 1/04

USPC .................................................... 15/250.361
See application file for complete search history.

(56) References Cited

U.S. PATENT DOCUMENTS

| | | | |
|---|---|---|---|
| 1,695,326 A * | 12/1928 | Folberth | B60S 1/4083 |
| | | | 15/250.32 |
| 2,800,676 A | 7/1957 | Makela et al. | |
| 3,042,953 A | 7/1962 | Batley | |
| 5,502,866 A | 4/1996 | Battlogg | |
| 6,526,620 B2 | 3/2003 | Horii et al. | |

(Continued)

FOREIGN PATENT DOCUMENTS

| | | |
|---|---|---|
| DE | 19632752 A1 | 2/1998 |
| DE | 102009022591 A1 | 12/2010 |

(Continued)

*Primary Examiner* — Katina N. Henson
(74) *Attorney, Agent, or Firm* — Dickinson Wright PLLC (57) ABSTRACT

A windshield wiper system includes a windshield wiper having a wiper blade with a near end and a far end. The windshield wiper is configured for performing a relative rotation of the wiper blade between the far end and the near end of the wiper blade. A mechanism applying a torque to the far end during a sweeping motion of the windshield wiper twists the far end of the wiper blade relative to the near end. The mechanism may perform the relative rotation of the wiper blade regardless of whether the wiper blade is in contact with a windshield. For example, the mechanism may include a stationary cam block having a cam profile, and an actuator arm moving along the cam profile with the sweeping motion of the windshield wiper. The cam profile is suitably shaped to pivot the actuator arm in laterally outer ranges of the sweeping motion.

16 Claims, 7 Drawing Sheets

(56) References Cited

U.S. PATENT DOCUMENTS

| | | |
|---|---|---|
| 6,654,984 B2 | 12/2003 | Hoshino |
| 2015/0121640 A1 | 5/2015 | Goddard |
| 2015/0121641 A1 | 5/2015 | Miller et al. |
| 2016/0332599 A1* | 11/2016 | Barretta ................ B60S 1/3411 |

FOREIGN PATENT DOCUMENTS

| | | |
|---|---|---|
| FR | 2757815 A1 | 7/1998 |
| GB | 897530 | 5/1962 |
| GB | 2200277 A | 8/1988 |

* cited by examiner

WINDSHIELD WIPER WITH ADAPTABLE ATTACK ANGLE

TECHNICAL FIELD

The present disclosure relates to a windshield wiper system, in particular for curved windshields.

BACKGROUND

When designing windshields for automotive vehicles and windshield wipers for windshields, it is difficult to construct windshield wipers for windshields with a large angle of curvature, especially with a curvature axis at an oblique angle relative to the wiper blade. Large windshield curvature angles can result in attack angles of the wiper blade that are outside the narrow range, in which the wiper blade can reliably clean a windshield, which is typically within a few degrees of deviation from attack angles perpendicular to the surface of the windshield.

Figure 1:
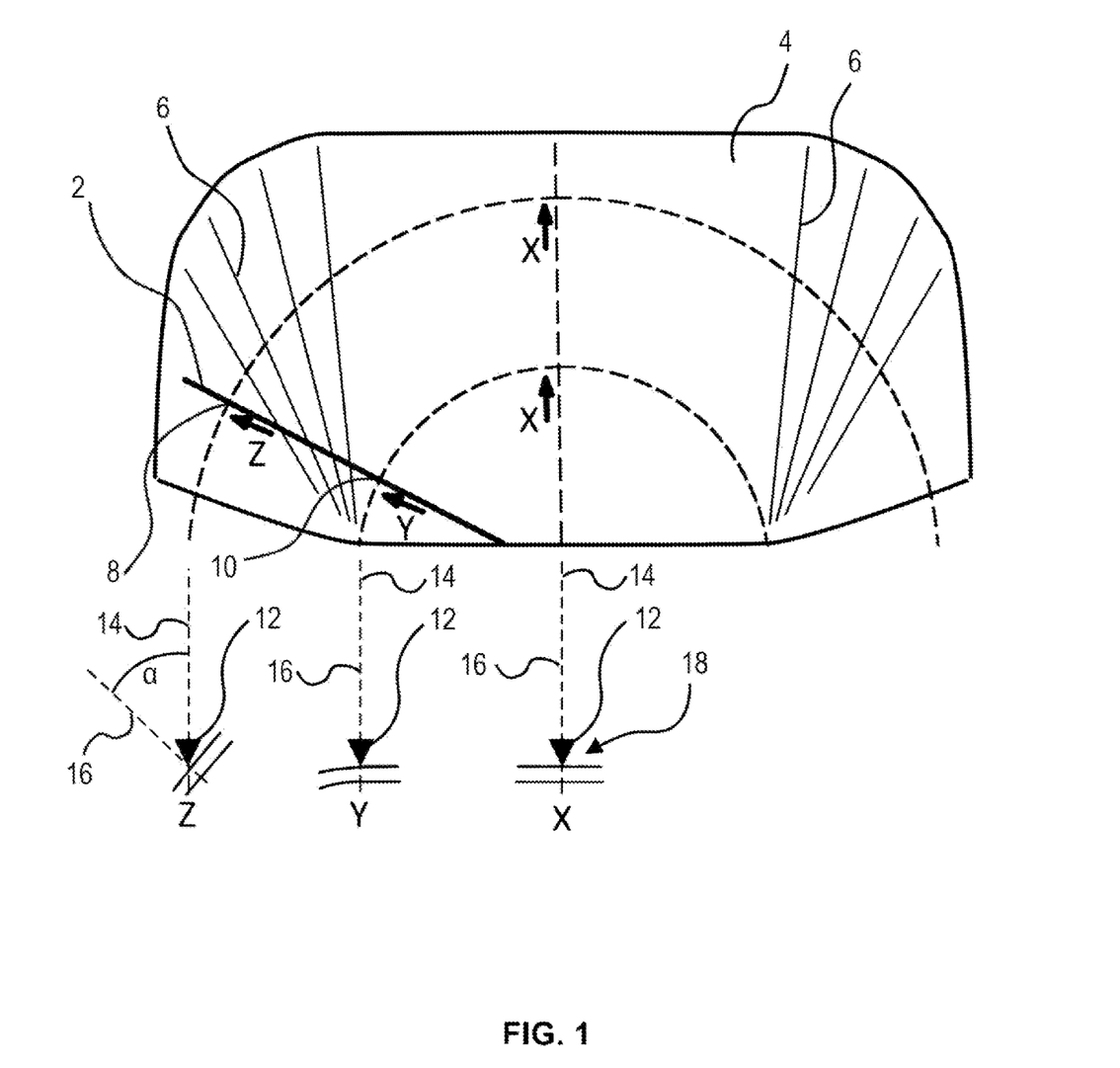
FIG. 1 shows the general principle of a wiper blade attack angle on a curved windshield.

FIG. 1 of the drawings schematically shows a windshield wiper 2 on a curved windshield 4. The shown windshield 4 has a relatively flat center, but is curved toward the lateral sides about curvature axes 6 indicated by thin lines on both lateral sides. The schematic windshield wiper 2 is shown as a bold line, where two points, i.e. one far point 8 and one near point 10, on the wiper blade 12 of the windshield wiper 2 are traced in broken lines along the sweeping motion across the windshield 4. The designations "far" and "near" indicate the relative distance from the wiper motor (not shown). As this depiction is only schematic, any different sweep curvature achieved by the mechanics between the windshield wiper 2 and the wiper motor is not shown. Viewing directions X, Y, and Z are marked on the windshield 4. The views presented in those viewing directions X, Y, and Z are schematically reproduced below the windshield 4 with the wiper blade 12 represented in cross-section as a triangle and, for simplicity, without a lip that can swivel.

The longitudinal plane 14 of symmetry through the schematic wiper blades determine the orientation of the wiper blade and thus the so-called attack angle α relative to the windshield 4. If the windshield wiper 2 is in the central position 18, both the far and the near points 8 and 10 of the windshield wiper 2 are oriented perpendicular to the windshield 4 and thus enclose an attack angle α of about zero degrees. The attack angle α is the angle between the wiper blade orientation 14 and a plane 16 normal to the windshield surface and likewise extending along the wiper blade 12. In the central position 18, the wiper blade orientation 14 coincides with the normal plane 16. When the windshield wiper 2 sweeps to either side of the windshield 4, the near point 10 may still be in the generally planar area as shown in view Y. The far point 8, however, has left the planar area and has passed the curved area of the windshield 4. The orientation 14 of the wiper blade 12 is not perpendicular to the windshield 4 anymore and encloses a large attack angle α. Because the windshield wiper 2 can only effectively clean a windshield at small attack angles α, car manufacturers have traditionally been limited in designing the curvature angles of windshields, sometimes to the detriment of field of vision and aerodynamics.

SUMMARY

According to the present disclosure, a windshield wiper system includes a windshield wiper having a wiper blade with a near end and a far end. The windshield wiper is configured for performing a relative rotation of the wiper blade between the far end and the near end of the wiper blade.

According to one example, a mechanism applying a torque to the far end during a sweeping motion of the windshield wiper twists the far end of the wiper blade relative to the near end.

The mechanism may be configured to perform the relative rotation of the wiper blade regardless of whether the wiper blade is in contact with a windshield. For example, the mechanism may include a stationary cam block having a cam profile, and an actuator arm moving along the cam profile with the sweeping motion of the windshield wiper. The cam profile is suitably shaped to pivot the actuator arm in laterally outer ranges of the sweeping motion.

The actuator arm may be fixedly attached to a flexible rod extending to the far end of the wiper blade, and the flexible rod in turn is connected to the far end of the wiper blade.

The flexible rod is preferably bendable, but withstands twisting under a torque applied by the actuator arm. The actuator arm, by pivoting about a pivot angle, causes the flexible rod to rotate at the far end of the wiper blade and to twist the far end of the wiper blade relative to the near end of the wiper blade by an amount determined by the pivot angle of the actuator arm.

The windshield wiper may have a wiper arm rotatably supporting the flexible rod by bearings disposed on the wiper arm.

The wiper blade has a tilt determined by the wiper arm, but preferably only the far end of the wiper blade is twisted relative to the tilt determined by the wiper arm, while the near end of the wiper blade maintains the tilt determined by the wiper arm.

In one example, the wiper arm is composed of a short arm section and a long arm section, wherein the long arm section is disposed between the short arm section and the wiper blade. The long arm section and the short arm section may be connected via a hinge. This hinge may be a living hinge. A tension spring acting between the long arm section and the short arm section may bias the long arm section toward a vehicle windshield in an installed configuration.

The windshield wiper system may include a wiper blade holder extending from the near end of the wiper blade to the far end of the wiper blade. The wiper blade holder is connected to the wiper arm at a wiper blade mount between the near end and the far end of the wiper blade. The wiper blade holder may include a sleeve extending between the wiper blade mount and the far end of the wiper blade, and the flexible rod may extend through the sleeve with sufficient play to rotate inside the sleeve.

The flexible rod need not be monolithic and may be composed of a plurality of connected parts. For example, a universal joint may connect two of the connected parts of the flexible rod with each other.

Further, the flexible shaft may be non-rotatably inserted into an end cap at the far end of the wiper blade, wherein in turn the end cap is rigidly connected to the far end of the wiper blade. This non-rotatable connection may be a keyed connection. Additionally, the non-rotatable connection may be glued or welded. Also, a fastener securing the end cap to the flexible rod may be present instead of or in addition to the other connection types.

BRIEF DESCRIPTION OF THE DRAWINGS

The attached drawings are provided herewith for purely illustrative purposes and are not intended to limit the scope of the present invention. In the drawings.

DETAILED DESCRIPTION OF THE DRAWINGS

The present disclosure presents the concept of a windshield wiper 20 with a wiper blade 22 that can adapt to greater windshield curvature angles than conventional windshield wipers. As discussed above, the attack angles α of the wiper blade 22 may differ between the far end 24 and the near end 26 of the wiper blade 22 so that tilting the entire wiper blade 22 may bring the far-end attack angle α into compliance at the detriment of the near-end attack angle α.

Accordingly, in order to bring the attack angles α of the entire wiper blade 22 within the range, in which the wiper blade 22 is effective, even with large windshield curvature angles, the present disclosure provides for a relative rotation between the far end 24 and the near end 26 of the wiper blade 22.

In the example discussed, the far end 24 of the wiper blade 22 can be actively twisted relative to the near end 26. The term "actively twisted" means that it is the wiper system 28, not the windshield 4 (shown in FIG. 1), that twists the wiper blade 22. The twist is thus not merely a reaction to the windshield curvature. On the contrary, the windshield wiper 20 of the shown example would twist while performing a sweeping motion, even if the windshield 4 were not present.

Alternatively, the twisting of the far end 24 of the wiper blade 22 may be passive, i.e. in reaction to the windshield surface as the wiper blade 22 sweeps across the windshield 4. For example, a pair of rollers (not shown) may be mounted near the far end 24 of the wiper blade 22, laterally offset in front of and behind the far end 24 with respect to the sweeping path. Such rollers may be coupled to the far end 24 of the wiper blade 22 and adapt the orientation of the far end 24 of the wiper blade 22 to be perpendicular to the surface of the windshield 4 as the rollers roll along with the sweeping motion.

The twisting function, active or passive, allows the wiper blade 22 to adjust its attack angle α as it travels across the windshield 4, even if the normal plane 16 of the windshield 4 at the far end 24 of the wiper blade 22 differs significantly from the normal plane at the near end 26 of the wiper blade 22.

Figures 2, 3, 4:
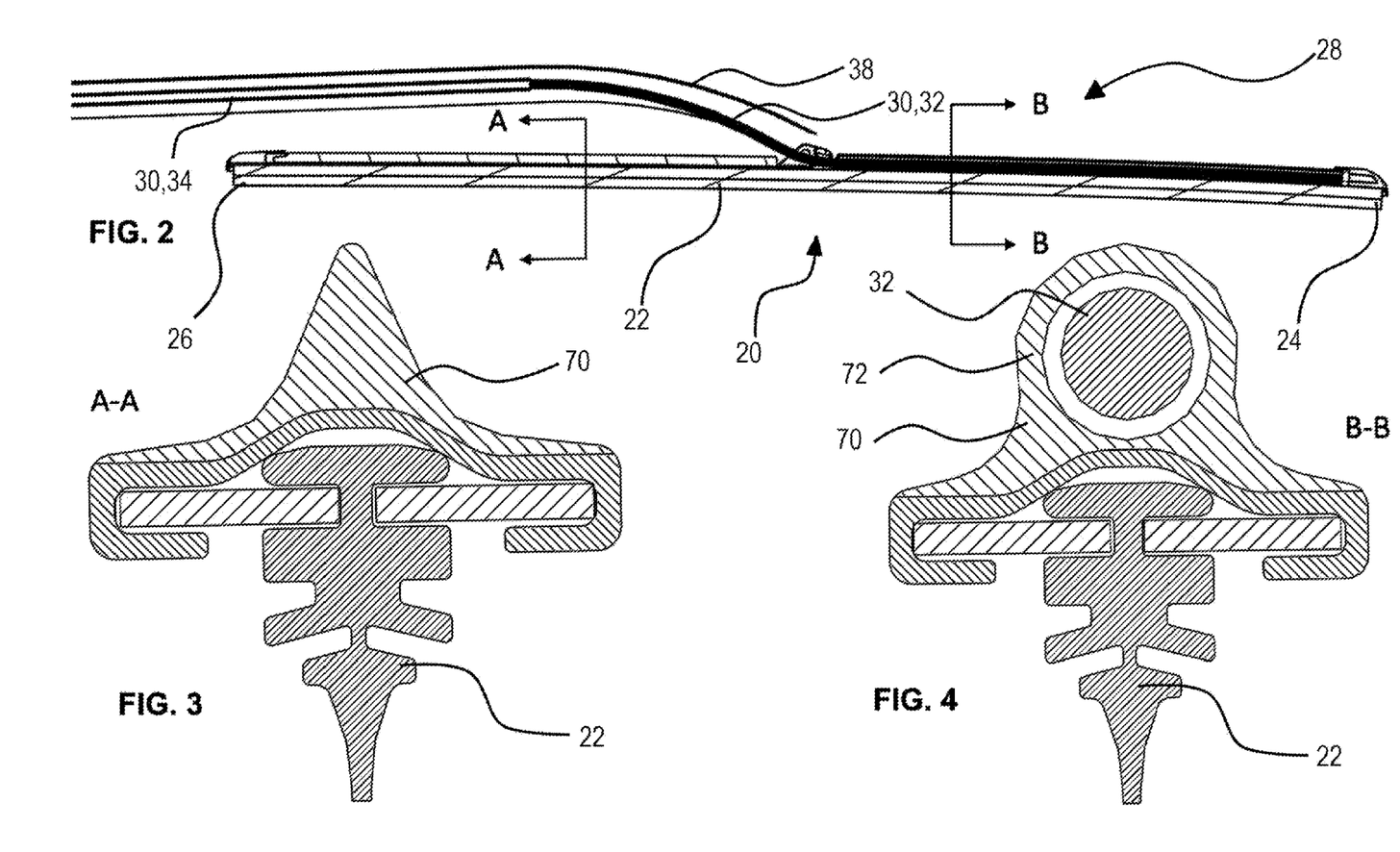
FIG. 2 shows a partial view of a wiper system according to one aspect of the present invention.
FIG. 3 shows cross-sectional view along the line A-A indicated in FIG. 2.
FIG. 4 shows cross-sectional view along the line B-B indicated in FIG. 2.

The twisting mechanism only rotates the far end 24 of the wiper blade 22, while the attack angle α of the near end 26 is determined by the rotary axis Z (see FIG. 9) of the wiper motor (not shown). As shown in FIG. 2 of the drawings, the twist of the far end 24 is accomplished by a flexible rod 30 that is bendable, but that does not twist in itself. In the present disclosure, the flexible rod 30 is composed of a flexible shaft 32, an upper torque tube 34, and a lower torque tube 36, which will be discussed below in more detail. It is, however, possible to form the flexible rod 30 as a single part.

Figure 5:
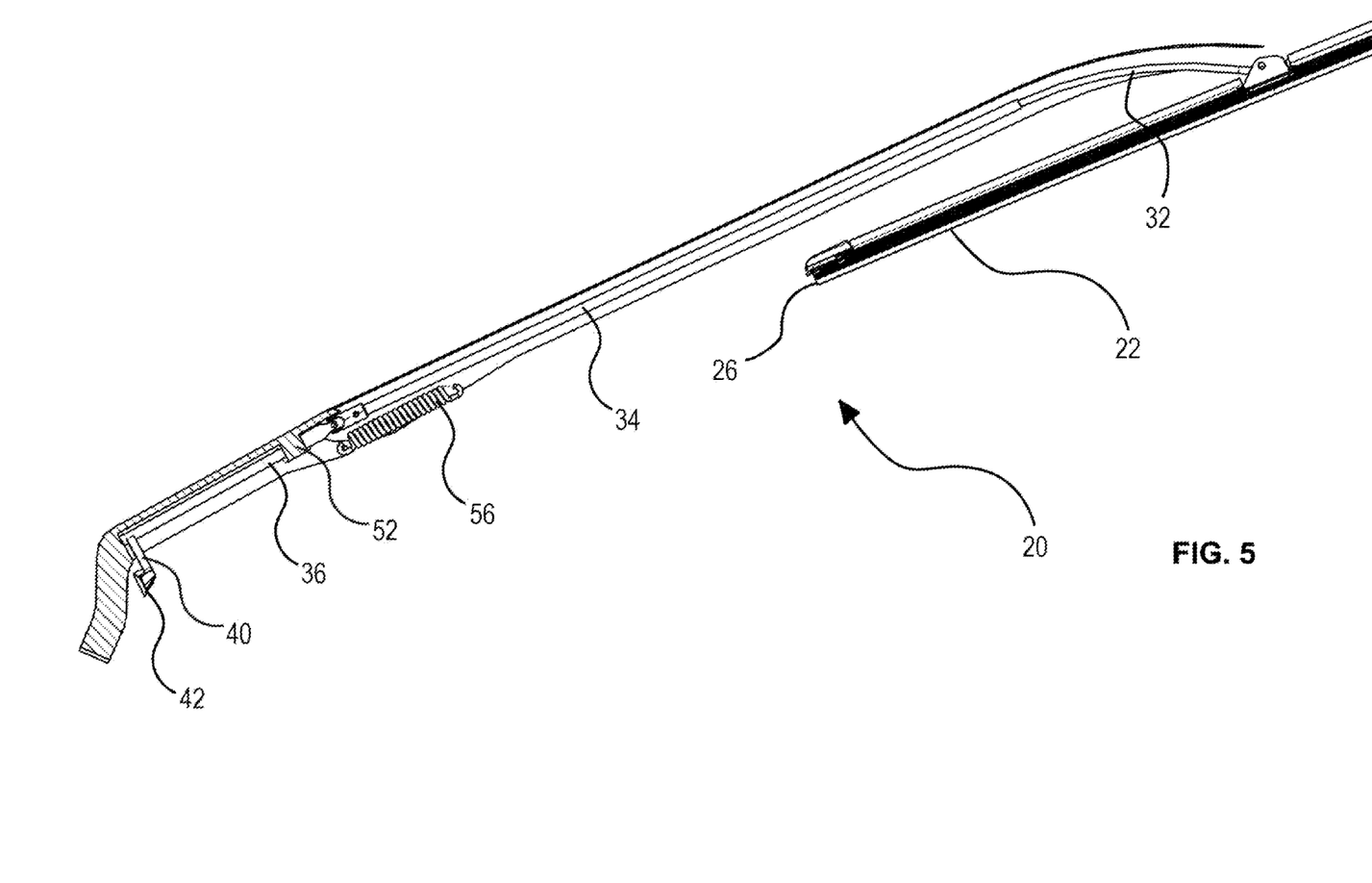
FIG. 5 shows a further partial view of the wiper system of FIG. 2.

The flexible rod 30 extends from the bottom of the windshield 4 through the wiper arm 38 to the far end 24 of the wiper blade 22. The far end of the flexible rod 30 is non-rotatably coupled to the far end 24 of the wiper blade 22. The near end of the flexible rod 30 includes a cam follower in the form of an actuator arm 40 at the free end of the lower torque tube 36 as shown in FIG. 5 of the drawings. The actuator arm 40 and lower torque tube 36 are rigidly connected to the flexible shaft 32. A cam block 42 is fixedly mounted to the vehicle in an installed state and incorporates a cam profile 44 for guiding the motion of the actuator arm 40.

Figure 6:
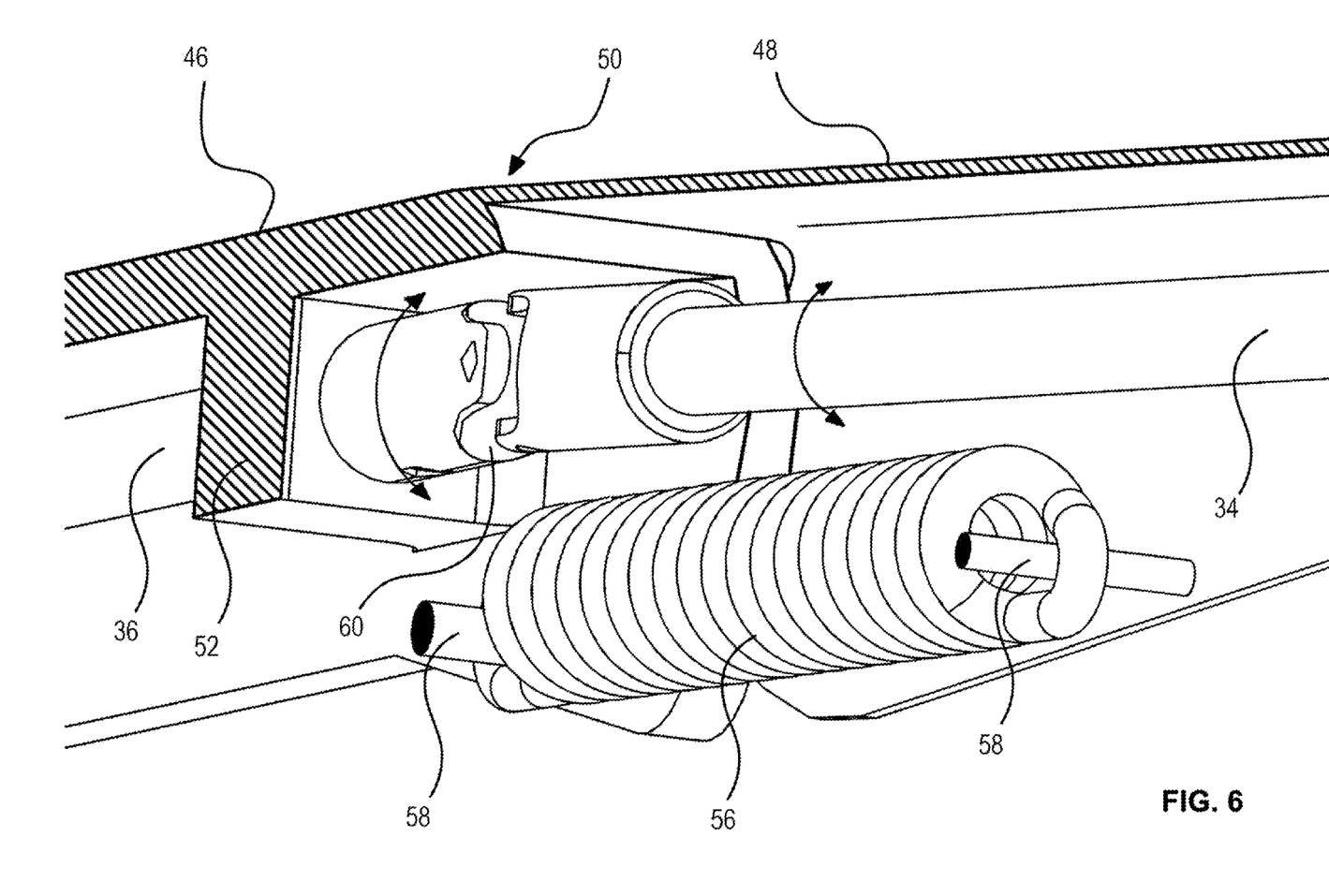
FIG. 6 shows a detail view of the wiper system of FIG. 2.

The wiper arm 38 is composed of a short arm section 46 adjacent to the wiper motor and a long arm section 48 adjacent to the wiper blade 22. The short arm section 46 and the long arm section 48 are connected via a hinge 50 with a hinge axis extending perpendicular to the wiper arm 38 in the plane of the sweeping motion. FIG. 6 of the drawings shows a detail view of the connection between the short arm section 46 and the long arm section 48 in a partial cross-section. In the shown example, the short arm section 46 and the long arm section 48 are monolithically formed, and the hinge 50 between them is a living hinge. The short arm section 46 is rigidly formed and includes a bearing 52 near its far end that supports the lower torque tube 36. The long arm section 48 has a reduced thickness in comparison with the short arm section 46 and thus is bendable. The living hinge 50 is realized by the long arm section 48 near the transition into the short arm section 46.

Notably, the short arm section 46 and long arm section 48 may be formed by two separate parts connected by a pivot joint in an overlapping area on both lateral sides, which is generally known to a person of ordinary skill. A tension spring 56 engages the short arm with one end and the long arm with the other end. The tension spring 56 is disposed between the hinge 50 and the windshield 4 and thus applies a torque on the hinge 50 that biases the wiper blade 22 against the windshield 4. To this end, each of the short arm and the long arm includes a spring engagement pin 58, between which the spring 56 exerts its tension force.

In the shown example, the flexible rod 30 extending through the wiper arm 38 is formed in this section by the lower torque tube 36 extending through the short arm section 46 and the upper torque tube 34 extending through the long arm section 48. The lower torque tube 36 is supported by the bearing 52 formed on the short arm section 46 near the far end of the short arm section 46 and ends in a universal joint 60 immediately adjacent to the far side of the bearing 52. The upper torque tube 34 extends from the universal joint 60 to the near end of the flexible shaft 32. As mentioned before, the entire flexible rod 30 may be monolithically formed by a single flexible shaft 32. Likewise, the upper torque tube 34 and the lower torque tube 36 may be formed monolithically, provided that the torque tube is flexible enough to bend with the hinge 50 under the spring force for ensuring sufficient pressure of the wiper arm 38 on the windshield 4.

Figure 7:
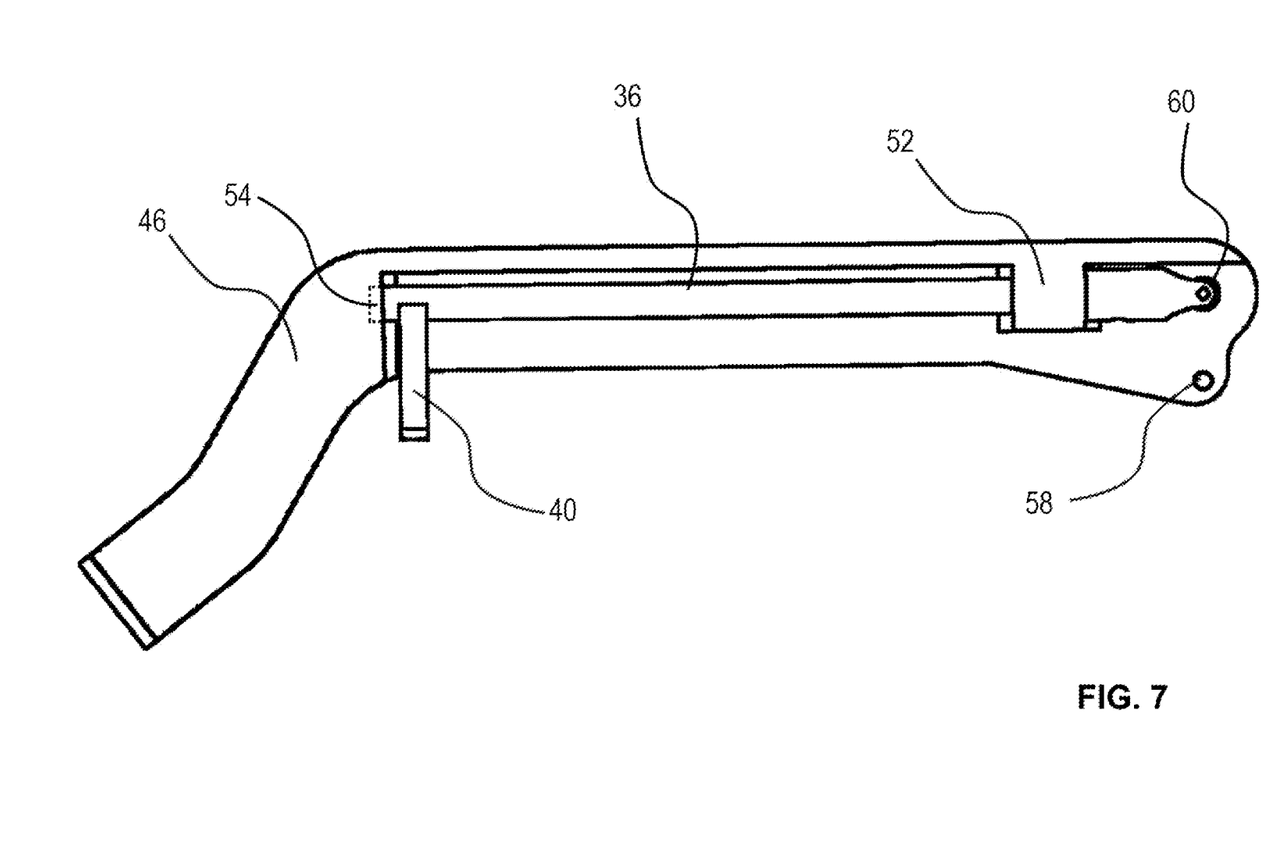
FIG. 7 shows a short-arm assembly of the wiper system of FIG. 2.

The short arm section 46 is shown in FIG. 7 of the drawings. The short arm section 46 not only forms the bearing 52 near its far end discussed above, but also a second bearing 54 supporting the near end of the flexible rod 30, here formed by the lower torque tube 36. The actuator arm 40 that contacts the cam block 42 is disposed immediately adjacent to this near-end bearing 54 for stability purposes.

Figure 8:
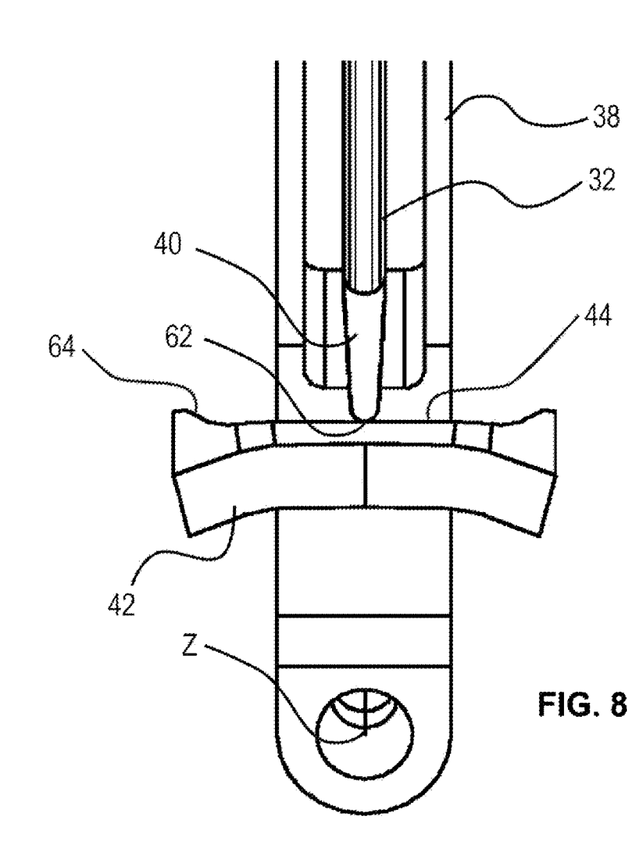
FIG. 8 shows an actuator arm in a central position on a cam profile.
Figure 9:
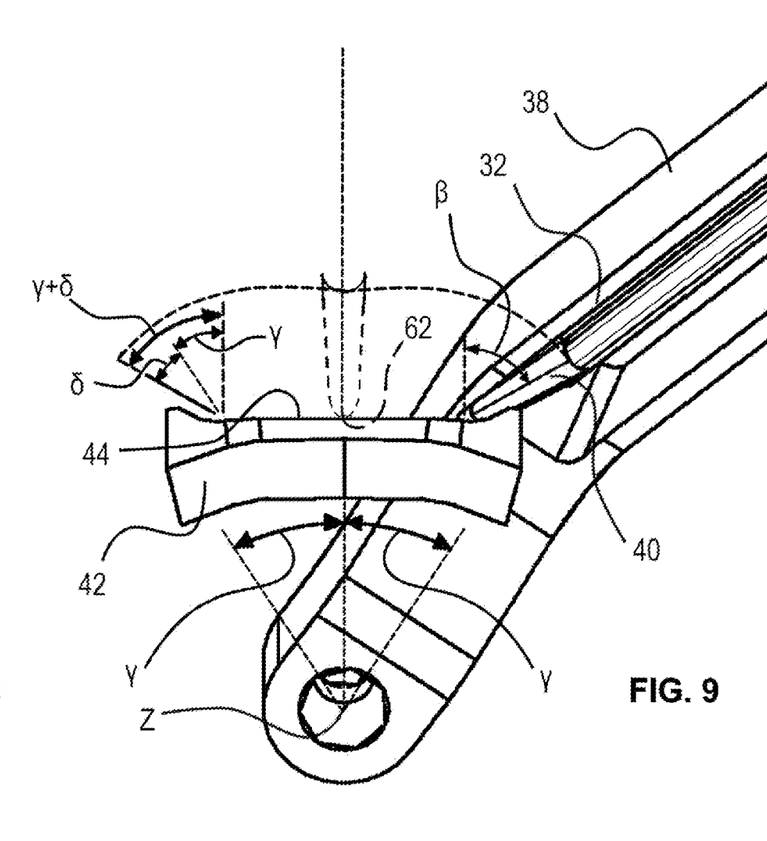
FIG. 9 show the actuator arm of FIG. 8 in a laterally displaced position on the cam profile.

As the wiper motor drives the wiper arm 38 sideways, the actuator arm 40 moves along the cam profile 44, which exerts a torque on the flexible rod 30. This is shown in FIGS. 8 and 9 of the drawings. The actuator arm 40 rotates the flexible rod 30, which in turn twists the far end 24 of the wiper blade 22 relative to the near end 26 of the wiper blade 22. The cam profile 44 has a curvature that tilts the actuator arm 40 to an orientation close to the normal plane of the windshield curvature near the far end 24 of the wiper blade 22. Thus, the cam profile 44 shown in FIGS. 8 and 9 is adapted for one specific windshield curvature and would look different for different windshield curvatures. By customizing the cam profile 44 for a given windshield curvature, the far end 24 of the wiper blade 22 is twisted as needed to keep the attack angle α of the far end 24 of the wiper blade 22 within the narrow permissible range.

FIG. 8 shows the wiper arm 38 in a central position so that the actuator arm 40 is positioned centrally on the cam block 42. In this position the cam profile 44 has a distance from the flexible rod 30 (in the form of the lower torque tube 36) that is equal to or greater than the distance of the free end 62 of the actuator arm 40 from the flexible rod 30. Accordingly, no torque is exerted on the flexible rod 30 by the cam profile 44 via the actuator arm 40. As the windshield wiper 20 moves about a sweep axis Z toward a lateral side, the actuator arm 40 travels along the cam profile 44. In the shown example, the cam profile 44 includes an upward slope 64 on both lateral sides. Accordingly, as shown in FIG. 9, the sweeping motion eventually takes the actuator arm 40 to a position on the cam profile 44 where the distance between the cam profile 44 and the flexible rod 30 is smaller than the length of the actuator arm 40. The wiper arm 38 is thus prevented from traveling any further, unless the actuator arm 40 pivots to a diagonal direction at a pivot angle β. This pivoting movement toward the pivot angle β of the actuator arm 40 rotates the flexible rod 30 along the wiper arm 38.

Figures 10, 11:
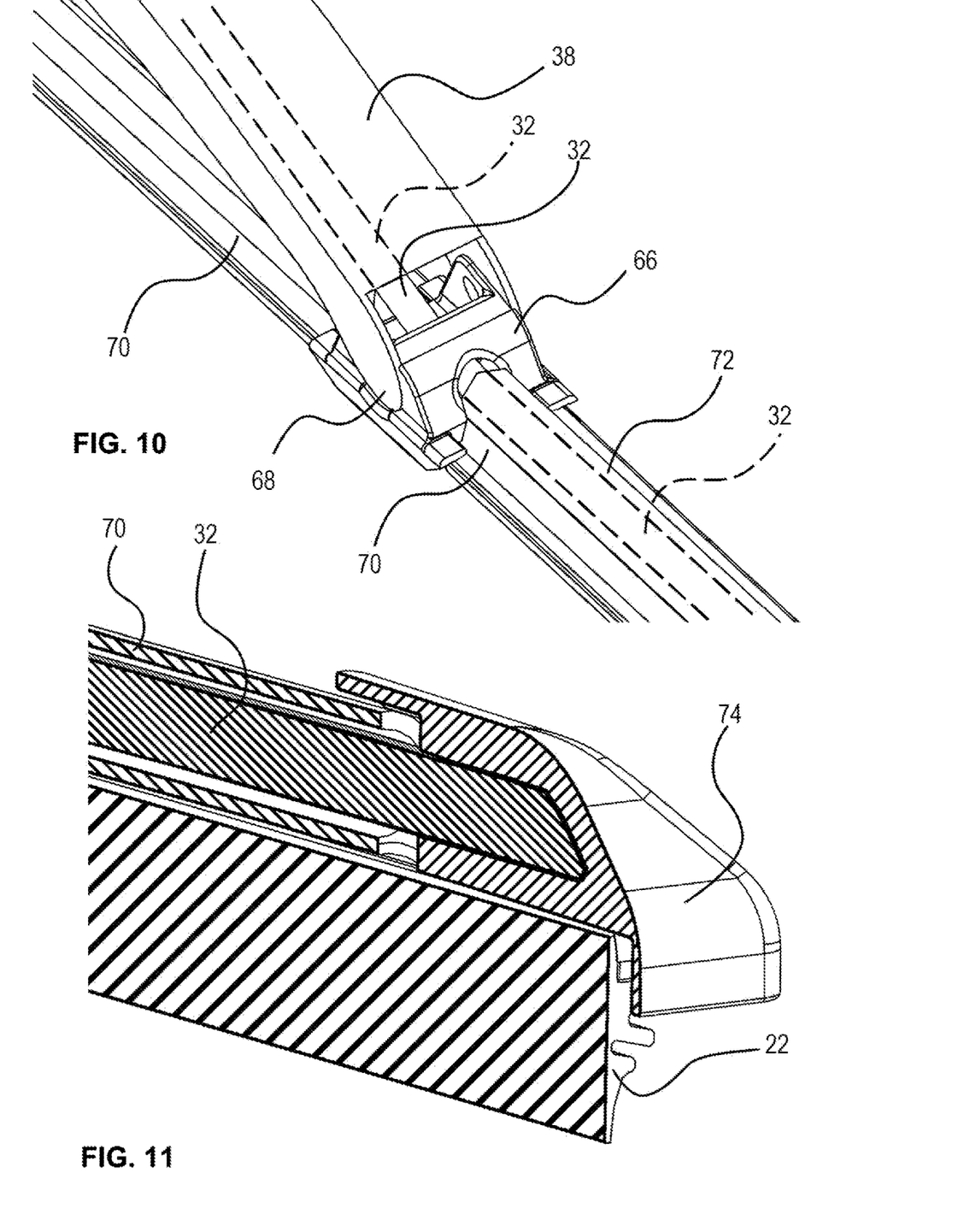
FIG. 10 shows a further detail view of the wiper system of FIG. 2.
FIG. 11 shows a cross-sectional detail view of a far end of the wiper system of FIG. 2.

The flexible rod 30, in this example represented by the lower torque tube 36, is rotatably supported by the bearings 52 and 54 of the short arm section 46. Continuing along the long arm section 48, the upper torque tube 34 ends where the flexible shaft 32 begins along the length of the long arm section 48. The flexible shaft 32 extends through a blade mount 66 as shown in FIG. 10 of the drawings. The blade mount 66 includes a pivot joint 68 to allow a blade holder 70 of the wiper blade 22 to pivot in a generally known manner.

The portion of the wiper blade holder 70 extending from the blade mount 66 to the near side of the wiper blade 22 is a solid structure as shown in the cross-sectional view A-A reproduced in FIG. 3 of the drawings. The portion of the wiper blade holder 70 extending from the blade mount 66 to the far end 24 of the wiper blade 22 includes a sleeve 72 formed on the wiper blade older 70 as shown in the cross-sectional view B-B reproduced in FIG. 4 of the drawings. The flexible shaft 32 extends through this sleeve 72 with sufficient play to rotate inside the sleeve 72.

At the far end 24 of the wiper blade 22, the flexible shaft 32 is non-rotatably inserted into an end cap 74 as shown in FIG. 11 of the drawings. The end of the flexible shaft 32 and the corresponding receptacle of the end cap 74 may be keyed and/or affixed by a suitable means, such as glue, one or more rivets, a screw, or other mechanical connections. The end cap 74 is rigidly connected to the far end 24 of the wiper blade 22, but it is separate from and movable relative to the wiper blade holder 70. Accordingly, the rotation of the flexible shaft 32 is transferred through the end cap 74 to the far end 24 of the wiper blade 22, while the wiper blade holder 70 retains its shape.

This results in the following angles marked in FIG. 9: The wiper arm 38 places the wiper blade 22 at a tilt angle γ that is the tilt angle γ of the near end 26 of the wiper blade 22. The cam profile 44, via the cam block 42, the actuator arm 40, and the flexible rod 30, applies an additional twist angle δ on the far end 24 of the wiper blade 22 so that the tilt angles γ of the near end 26 of the wiper blade 22 and (γ+δ) of the far end 24 of the wiper blade 22 differ by the twist angle δ effected by the cam profile 44. The twist angle δ, added to the far end 24 but not to the near end 26 of the wiper blade 22, reduces the attack angle α shown in location Z in FIG. 1 of the drawings. The cam profile 44 shown of FIGS. 8 and 9 has a shape that brings the attack angle α within acceptable limits.

While the above description constitutes the preferred embodiments of the present invention, it will be appreciated that the invention is susceptible to modification, variation and change without departing from the proper scope and fair meaning of the accompanying claims.

The invention claimed is:

1. A windshield wiper system comprising a windshield wiper having a wiper blade with a near end and a far end, the windshield wiper system being configured for performing a relative rotation of the wiper blade between the far end and the near end of the wiper blade, wherein a mechanism applying a torque to the far end during a sweeping motion of the windshield wiper twists the far end of the wiper blade relative to the near end, the mechanism applying the torque to the far end during the sweeping motion of the windshield wiper is configured to perform the relative rotation of the wiper blade regardless of whether the wiper blade is in contact with a windshield, the twisting allows the wiper blade to adjust its attack angle ∝ as it travels across the windshield, even if a plane normal to the windshield at the far end of the wiper blade differs from the plane normal to the windshield at the near end of the wiper blade, and the attack angle ∝ is an angle between a wiper blade orientation and the plane normal to the windshield.

2. The windshield wiper system of claim 1 wherein the mechanism comprises a stationary cam block having a cam profile, and an actuator arm moving along the cam profile with the sweeping motion of the windshield wiper, wherein the cam profile is shaped to pivot the actuator arm in laterally outer ranges of the sweeping motion.

3. The windshield wiper system of claim 2, wherein the actuator arm is fixedly attached to a flexible rod extending to the far end of the wiper blade and the flexible rod is connected to the far end of the wiper blade.

4. The windshield wiper system of claim 3, wherein the flexible rod is bendable and withstands twisting under a torque applied by the actuator arm, wherein the actuator arm, by pivoting about a pivot angle, causes the flexible rod to rotate at the far end of the wiper blade and to twist the far end of the wiper blade relative to the near end of the wiper blade by an amount determined by the pivot angle of the actuator arm.

5. The windshield wiper system of claim 3, further comprising a wiper arm configured to move the wiper in the sweeping motion, wherein the flexible rod is rotatably supported by bearings disposed on the wiper arm.

6. The wiper system of claim 5, wherein the wiper blade has a tilt determined by the wiper arm, wherein only the far end of the wiper blade is twisted relative to the tilt determined by the wiper arm and wherein the near end of the wiper blade maintains the tilt determined by the wiper arm.

7. The wiper system of claim 5, wherein the wiper arm is composed of a short arm section and a long arm section, the long arm section being longer than the short arm section, wherein the long arm section is disposed between the short arm section and the wiper blade.

8. The wiper system of claim 7, wherein the long arm section and the short arm section are connected via a hinge.

9. The wiper system of claim 8, wherein the hinge is a living hinge.

10. The wiper system of claim 7 wherein a tension spring acting between the long arm section and the short arm section biases the long arm section toward a vehicle windshield in an installed configuration.

11. The wiper system of claim 3, wherein the flexible rod is composed of a plurality of connected parts, wherein a universal joint connects two of the connected parts with each other.

12. The wiper system of claim 3, further comprising an end cap into which the flexible shaft is non-rotatably inserted at the far end of the wiper blade, wherein the end cap is rigidly connected to the far end of the wiper blade.

13. The wiper system of claim 12, wherein the flexible shaft and the end cap form a keyed connection.

14. The wiper system of claim 12, wherein the flexible shaft is glued or welded to the end cap.

15. The wiper system of claim 12, wherein the end cap is secured to the flexible shaft via a fastener.

16. A windshield wiper system comprising a windshield wiper having a wiper blade with a near end and a far end, the windshield wiper system being configured for performing a relative rotation of the wiper blade between the far end and the near end of the wiper blade,
  wherein a mechanism applying a torque to the far end during a sweeping motion of the windshield wiper twists the far end of the wiper blade relative to the near end,
  the mechanism comprises a stationary cam block having a cam profile, and an actuator arm moving along the cam profile with the sweeping motion of the windshield wiper, wherein the cam profile is shaped to pivot the actuator arm in laterally outer ranges of the sweeping motion,
  the actuator arm is fixedly attached to a flexible rod extending to the far end of the wiper blade and the flexible rod is connected to the far end of the wiper blade,
  further comprising a wiper blade holder extending from the near end of the wiper blade to the far end of the wiper blade, the wiper blade holder being connected to the wiper arm at a wiper blade mount between the near end and the far end of the wiper blade, wherein the wiper blade holder includes a sleeve extending between the wiper blade mount and the far end of the wiper blade, and wherein the flexible rod extends through the sleeve with sufficient play to rotate inside the sleeve.

* * * * *